No. 640,572. Patented Jan. 2, 1900.
C. L. KNEELAND.
CENTRIFUGAL CREAM SEPARATOR.
(Application filed May 13, 1897. Renewed June 9, 1899.)
(No Model.)
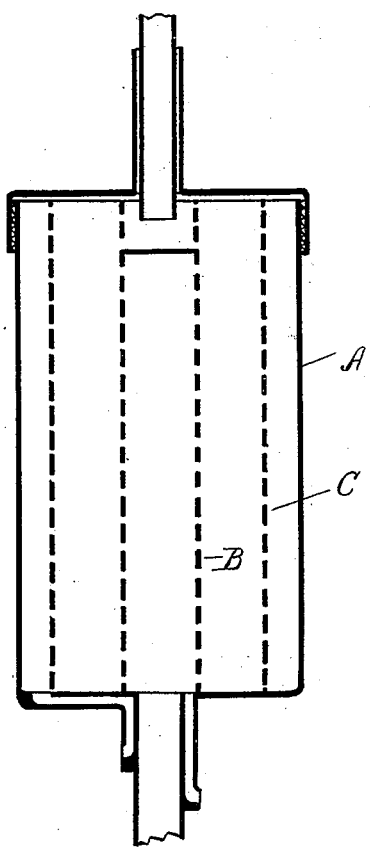
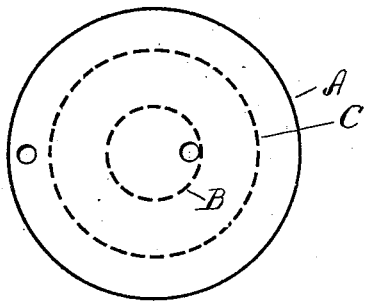
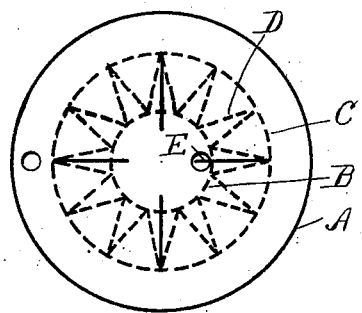
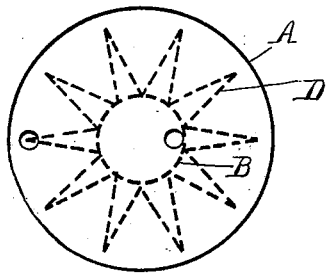
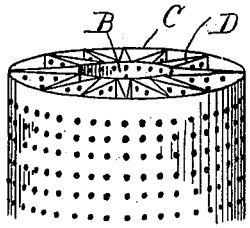
Inventor
Charles L. Kneeland

United States Patent Office.

CHARLES L. KNEELAND, OF LANSING, MICHIGAN, ASSIGNOR OF ONE-HALF TO GUY W. RENYX, OF SAME PLACE.

CENTRIFUGAL CREAM-SEPARATOR.

SPECIFICATION forming part of Letters Patent No. 640,572, dated January 2, 1900.

Application filed May 13, 1897. Renewed June 9, 1899. Serial No. 719,958. (No model.)

*To all whom it may concern:*

Be it known that I, CHARLES L. KNEELAND, a citizen of the United States, residing at Lansing, in the county of Ingham and State of Michigan, have invented certain new and useful Improvements in Separators, of which the following is a specification, reference being had therein to the accompanying drawings.

It is the object of my invention to obtain a quieting structure adapted to be placed within the separating-bowl of a centrifugal separator and which will assist the rapid and effective separation of the fluid therein into the component parts.

The invention consists in the peculiar construction of this internal structure or quieting-screen, as more fully hereinafter described and claimed.

In the drawings, Figure 1 is a diagrammatic vertical longitudinal section through a separating-bowl to which my improvement is applied and taken on line 1 of Fig. 3. Fig. 2 is a diagrammatic horizontal section similar to Fig. 3, but omitting parts shown in the latter. Fig. 3 is a diagrammatic horizontal section of the separator shown in Fig. 1. Fig. 4 is a diagrammatic section similar to Fig. 3, omitting parts shown in the latter figure. Fig. 5 is a perspective view of the quieting-screen of Fig. 3 detached.

A is a separating-bowl of any suitable construction, being provided with a central inlet-passage at its upper end and discharge-passages at its lower end opening from the bowl at different distances from the axis thereof. Within this bowl is arranged my improved internal structure, the construction of which is based on the principle that the separation is most speedily and effectually accomplished where there is the greatest freedom for radial movement of the component parts of the substance to be separated, together with the least opportunity for the formation of eddies or other disturbing currents within the bowl. To fulfil these conditions, I arrange perforated quieting-screens within the body, and I have discovered that their efficiency is greatest where the perforations are most uniformly distributed.

In Fig. 2 I show a simple structure comprising concentric cylindrical screens B C, formed of uniformly-perforated diaphragms, and these I preferably arrange in such position as to divide the space within the bowl into inner and outer compartments for containing, respectively, the lighter and heavier of the separated products, with a compartment between which forms the zone of separation and into which the liquid to be separated is first fed. In Fig. 3 I show a structure containing in addition the zigzag screen D, comprising a series of substantially V-shaped screens between the screens B C, which divides the zone of separation into a number of compartments, this screen also being formed of uniformly-perforated material. I preferably arrange also one or more imperforate wings E, extending in radial lines and serving to effectually bar any circulating currents. These structures I have found by actual use to be very efficient in assisting the separation and their operation will be readily understood, as it will be observed that they more perfectly fulfil the necessary conditions than structures that have been heretofore employed—viz., of permitting the heavier particles to pass outward and the lighter ones inward and yet effectually preventing the formation of any disturbing currents.

While I have described the screen employed in my structure as being formed of uniformly-perforated material, I do not wish to be limited to a structure in which the perforations are distributed with absolute uniformity, but mean a close approximation to a uniform distribution over the area of the diaphragm. Again, I do not wish to be limited to a screen formed by perforating an imperforate plate, as one formed of wire-netting or in any other way to uniformly distribute the apertures would answer the purpose equally well.

In Fig. 4 I show another modification in which a single annular screen is employed, together with the zigzag screen arranged around it.

What I claim as my invention is—

1. In a centrifugal separator, the combination with the bowl, of two cylindrical quieting-screens perforated throughout their surfaces and arranged concentrically within said bowl separated from and arranged one within the other, an inlet-conduit to admit the material between said screens, and outlet-conduits leading from the central and outer portions of the bowl.

2. In a centrifugal separator, the combination with the bowl, of a cylindrical quieting-screen perforated throughout and arranged concentrically within said bowl, a vertically-disposed zigzag screen perforated throughout and arranged in said bowl around said cylindrical screen, an inlet-conduit to admit the material to said bowl, and outlet-conduits leading from the central and outer portions of said bowl.

3. In a centrifugal separator, the combination with the bowl, of cylindrical quieting-screens perforated uniformly throughout and arranged concentrically within the bowl, and a zigzag screen similarly perforated arranged between said cylindrical screens, substantially as described.

4. In a centrifugal separator, the combination with the outer casing or bowl, of an internal structure comprising the concentric screens B and C uniformly perforated throughout, the zigzag screen D between, and one or more imperforate radial wings E arranged substantially as described.

In testimony whereof I affix my signature in presence of two witnesses.

CHARLES L. KNEELAND.

Witnesses:
BLANCHE BOOSINGER,
CLARK C. WOOD.